Figures 1, 2, 3:
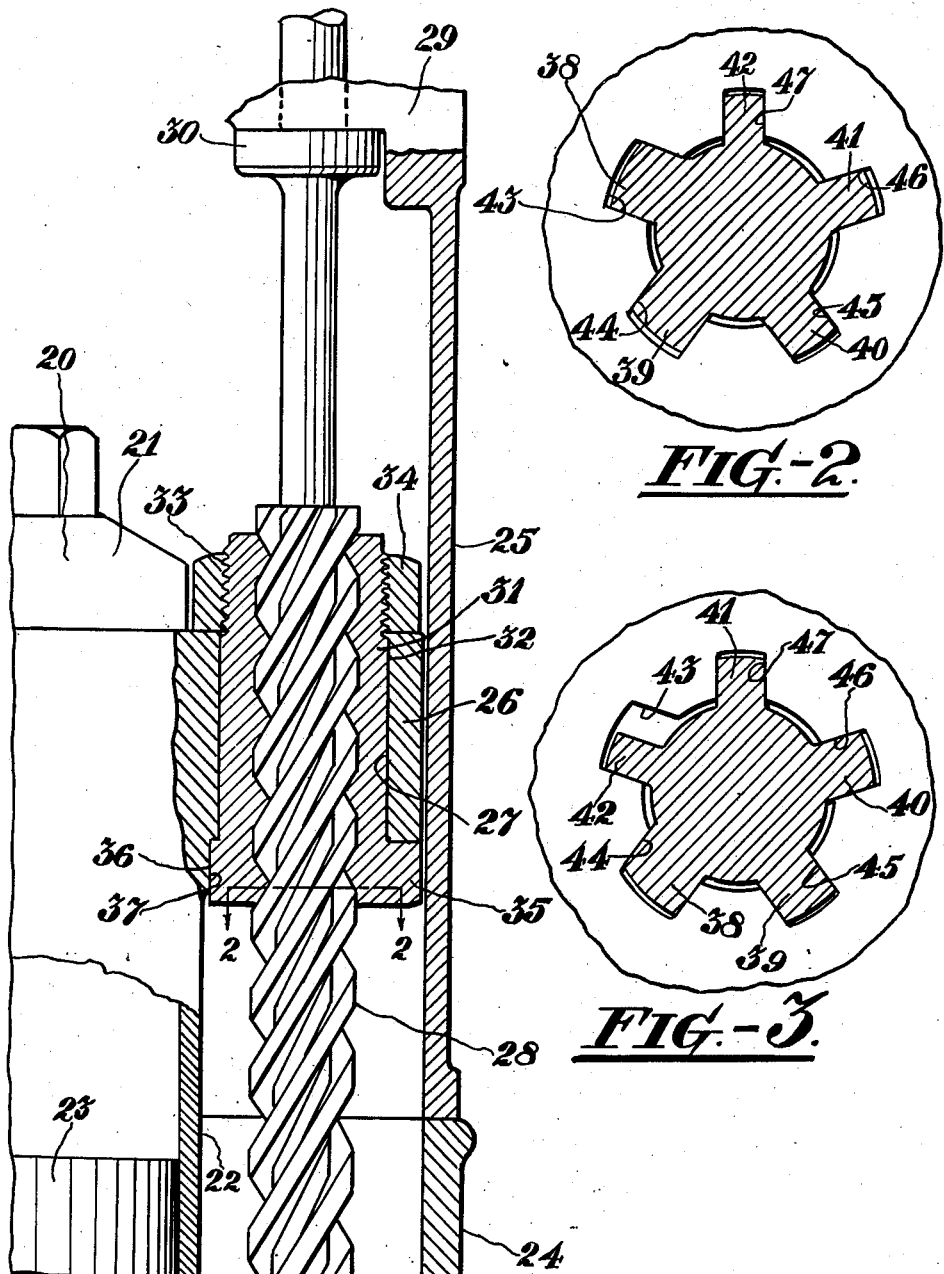

June 6, 1939.  J. I. HULSHIZER  2,161,052
WEAR COMPENSATING DEVICE
Filed Oct. 7, 1937

INVENTOR
Joseph I. Hulshizer
BY
HIS ATTORNEY.

Patented June 6, 1939

2,161,052

UNITED STATES PATENT OFFICE 2,161,052

WEAR COMPENSATING DEVICE

Joseph I. Hulshizer, Stewartsville, N. J., assignor to Ingersoll-Rand Company, Jersey City, N. J., a corporation of New Jersey Application October 7, 1937, Serial No. 167,711

4 Claims. (Cl. 74—424.8)

This invention relates to wear compensating devices, and more particularly to a wear compensating device adapted for use in connection with rock drill feeding mechanism, such as a feed screw which controls movement of the rock drill relatively to its mounting.

In practice, devices of the character to which the present invention pertains are subjected to severe vibration incident to the operation of the rock drill and as a result the cooperating surfaces of the feed screw and the feed nut wear rapidly so that excessive clearances are formed between them. As will be readily appreciated, an undue amount of clearance between the feed screw and the feed nut will greatly reduce the effectiveness of the rock drill since, unless a firm transmission path is maintained between the feed nut and the feed screw, a considerable portion of the force of the blow of the hammer piston of the rock drill is wasted in shifting the rock drill the distance permitted by the clearance between the threads before the blow is delivered against the working implement.

One object of the invention is to compensate for wear on the threads of the feed screw and the portion of the rock drill which the feed screw engages.

Other objects will be in part obvious and in part pointed out hereinafter.

In the drawing accompanying this specification and in which similar reference numerals refer to similar parts, Figure 1 is a longitudinal elevation, partly in section, of a rock drill and its support having the invention applied thereto, Figure 2 is a transverse view taken through Figure 1 on the line 2—2 and showing the threads of the feed screw in the feed nut flutes which they initially occupy, and Figure 3 is a view similar to Figure 2 showing the threads of the feed screw in the flutes which they occupy after the first adjustment between the feed screw and the feed nut has been effected.

Referring more particularly to the drawing, 20 designates a motor illustrated as a rock drill of which only the back head 21 and a portion of the cylinder 22 are shown. Within the cylinder is a reciprocatory hammer piston 23 to deliver blows to a working implement, as for example a drill steel (not shown). A suitable support is provided for the motor 20 in the form of a shell 24 having a rearward extension 25 which may be secured to the shell in any suitable manner.

In accordance with a well known practice, the cylinder 22 is provided with a lug 26 having a bore 27 through which extends a feed screw 28 adapted to control longitudinal movement of the rock drill with respect to the shell.

The front end of the feed screw may be journaled in the shell in the usual manner, and a bearing 29 is provided on the rear end of the shell and for the corresponding end of the feed screw and also to serve as an abutment for a collar 30 carried by the feed screw. The feed screw 28 is rotatable with respect to its bearings and may be actuated either manually as by a hand crank (not shown) or by the jars imparted to the cylinder of the rock drill by the piston 23 and which jars are transmitted to the feed screw through an element carried by the rock drill, in this instance a feed nut 31 arranged within the bore 27, and intermeshing with the feed screw.

Exteriorly, the feed nut 31 may be of conventional form, having a cylindrical portion 32 which lies within the bore 27 and on the portion of the feed nut lying rearwardly of the lug 26 are external threads 33 for engagement with a nut 34 which seats against the rear end of the lug 26 to clamp the feed nut firmly in position. On the opposite or front end of the feed nut is a head 35 which shoulders against the lug 26, and on the side of the head 35 is a flatted surface 36 which engages a similar surface 37 on the cylinder 22 to prevent rotary movement of the feed nut with respect to the lug 26.

In accordance with the practice of the invention, the threads of the feed screw, of which five are shown and designated 38, 39, 40, 41 and 42, are of the same lead and of different widths, decreasing progressively in widths from that designated 38. The feed nut 31 is likewise provided with flutes of suitable widths to slidably receive the threads for the initial assembling of the parts. Thus, a flute 43 is formed in the feed nut to accommodate the thread 38 and other flutes of progressively decreasing widths and designated 44, 45, 46 and 47 are provided to initially accommodate the threads 39, 40, 41 and 42, respectively.

The amounts in which the widths of the threads differ between successive threads equal substantially the degree of wear which is permissible between them and the surfaces of the flutes before replacement of the feed screw or the feed nut, or both, as ordinarily constructed is required, or before adjustments are necessitated in structures equipped with devices to compensate for lost motion between the parts as a result of wear.

Assuming, for the sake of this discussion, that the maximum permissible clearance between the threads of the feed screw and those of the feed nut may be, say ten thousandths of an inch, the initial difference in width between a flute and the next succeeding flute will then be ten thousandths of an inch. Thus, when, owing to wear, the clearance becomes increased to that extent the feed screw is removed from the feed nut and reinserted to place the thread 38 in the flute 44, the thread 39 in the flute 45 and so on and in that way reestablish a tight joint between the feed screw and the feed nut without requiring the replacement of either.

After the feed screw and the feed nut become worn further to an extent necessitating another adjustment the above procedure is again carried out and may be repeated as often as required until the parts become worn to a condition of uselessness.

I claim:

1. A wear compensating device, comprising a male member having a thread, and a female member having a plurality of flutes and each flute being of a different width than the other flutes to successively accommodate the thread accordingly as the width of the thread decreases through wear.

2. A wear compensating device, comprising a male member having a thread, and a female member having a flute to initially accommodate the thread and having a second flute of less width than the first said flute to accommodate the thread whenever the thread becomes worn to the width of the second mentioned flute.

3. A wear compensating device, comprising a male member having a series of threads of the same lead and each thread being of a different width than the adjacent thread, and a female member having flutes to accommodate the threads.

4. A wear compensating device, comprising a male member having a series of threads of the same lead and each thread being of a different width than the other threads, and a female member having flutes of different widths to accommodate the threads.

JOSEPH I. HULSHIZER.